(12) United States Patent
Sun et al.

(10) Patent No.: US 12,081,294 B2
(45) Date of Patent: Sep. 3, 2024

(54) NR MIMO OPERATION ENHANCEMENT

(71) Applicant: Apple Inc., Cupertino, CA (US)

(72) Inventors: Haitong Sun, Irvine, CA (US); Yushu Zhang, Beijing (CN); Wei Zeng, San Diego, CA (US); Dawei Zhang, Saratoga, CA (US); Weidong Yang, San Diego, CA (US); Sigen Ye, Whitehouse Station, NJ (US); Jie Cui, San Jose, CA (US); Yang Tang, Cupertino, CA (US); Chunhai Yao, Beijing (CN); Chunxuan Ye, San Diego, CA (US); Hong He, Cupertino, CA (US); Oghenekome Oteri, San Diego, CA (US)

(73) Assignee: Apple Inc., Cupertino, CA (US)

( * ) Notice: Subject to any disclaimer, the term of this patent is extended or adjusted under 35 U.S.C. 154(b) by 277 days.

(21) Appl. No.: 17/442,129

(22) PCT Filed: Aug. 5, 2020

(86) PCT No.: PCT/CN2020/107093
§ 371 (c)(1),
(2) Date: Sep. 22, 2021

(87) PCT Pub. No.: WO2022/027310
PCT Pub. Date: Feb. 10, 2022

(65) Prior Publication Data
US 2022/0302966 A1 Sep. 22, 2022

(51) Int. Cl.
*H04B 7/0456* (2017.01)
*H04L 5/00* (2006.01)
*H04W 72/23* (2023.01)

(52) U.S. Cl.
CPC ......... *H04B 7/0456* (2013.01); *H04L 5/0048* (2013.01); *H04W 72/23* (2023.01)

(58) Field of Classification Search
CPC .. H04B 7/0456; H04B 7/0404; H04B 7/0691; H04L 5/0048; H04L 5/0023; H04W 72/23
See application file for complete search history.

(56) References Cited

U.S. PATENT DOCUMENTS

| 2018/0367205 A1 | 12/2018 | Liu et al. |
| 2020/0106645 A1 | 4/2020 | Tsai |

(Continued)

FOREIGN PATENT DOCUMENTS

| CN | 1100348775 A | 7/2019 |
| CN | 100855411 A | 2/2020 |

(Continued)

OTHER PUBLICATIONS

International Search Report for PCT Patent Application No. PCT/CN2020/107093; Aug. 5, 2020.

(Continued)

*Primary Examiner* — Jung H Park
(74) *Attorney, Agent, or Firm* — Kowert, Hood, Munyon, Rankin & Goetzel, P.C.

(57) ABSTRACT

Embodiments are presented herein of apparatuses, systems, and methods for a user equipment device (UE) to establish a cellular connection with a base station. The UE may receive multiple input, multiple output (MIMO) uplink configuration information from the base station. The MIMO configuration information may indicate a plurality of sounding reference signal (SRS) resources. The UE may receive downlink control information (DCI) from the base station, which may specify a plurality of MIMO parameters. The UE may perform uplink MIMO communication with the base station according to the MIMO configuration and the plurality of MIMO parameters.

20 Claims, 8 Drawing Sheets

(56) References Cited

U.S. PATENT DOCUMENTS

| | | | | |
|---|---|---|---|---|
| 2021/0111847 A1* | 4/2021 | Yang | ..................... | H04L 5/0094 |
| 2022/0329307 A1* | 10/2022 | Yao | ..................... | H04B 7/0639 |
| 2023/0132207 A1* | 4/2023 | Yuan | ..................... | H04L 5/0051 |
| | | | | 375/267 |
| 2023/0179368 A1* | 6/2023 | Nilsson | ............... | H04L 25/0204 |
| | | | | 370/329 |
| 2023/0276454 A1* | 8/2023 | Zhu | ........................ | H04L 5/005 |
| | | | | 370/329 |

FOREIGN PATENT DOCUMENTS

| | | |
|---|---|---|
| CN | 110858775 A | 3/2020 |
| CN | 111464273 A | 7/2020 |
| WO | 2020101780 | 5/2020 |

OTHER PUBLICATIONS

Nokia et al. "On adaptation of maximum number of MIMO layers"; 3GPP TSG-RAN WG2 Meeting #107bis R2-1913109; Chongqing, China; Oct. 18, 2019.
Supplemental European Search Report for EP Patent Application No. 20948437.7; Apr. 8, 2024.
Office Action for IN Patent Application No. 202317004509; Apr. 26, 2024.

* cited by examiner

The minimum guard period between two SRS resources of an SRS resource set for antenna switching

| $\mu$ | $\Delta f = 2^\mu \cdot 15[kHz]$ | Y[symbol] |
|---|---|---|
| 0 | 15 | 1 |
| 1 | 30 | 1 |
| 2 | 60 | 1 |
| 3 | 120 | 2 |

NR MIMO OPERATION ENHANCEMENT

PRIORITY CLAIM INFORMATION

This application is a U.S. National Stage application of International Application No. PCT/CN2020/107093, filed Aug. 5, 2020, titled "NR MIMO Operation Enhancement", which is hereby incorporated by reference in its entirety.

TECHNICAL FIELD

The present application relates to wireless devices, and more particularly to apparatuses, systems, and methods for acquiring on demand system information.

DESCRIPTION OF THE RELATED ART

Wireless communication systems are rapidly growing in usage. Wireless devices, particularly wireless user equipment devices (UEs), have become widespread. Additionally, there are a variety of applications (or apps) hosted on UEs that perform or depend on wireless communication, such as applications that provide messaging, email, browsing, video streaming, short video, voice streaming, real-time gaming, or various other online services.

Increased reliability in these communication systems are desirable.

SUMMARY

Embodiments are presented herein of apparatuses, systems, and methods for a user equipment device (UE) to establish a cellular connection with a base station. The UE may receive multiple input, multiple output (MIMO) uplink configuration information from the base station. The MIMO configuration information may indicate a plurality of sounding reference signal (SRS) resources. The UE may receive downlink control information (DCI) from the base station, which may specify a plurality of MIMO parameters. The UE may perform uplink MIMO communication with the base station according to the MIMO configuration and the plurality of MIMO parameters.

In some embodiments, a non-transitory memory medium may include program instructions executable by a UE that, when executed, cause the UE to perform at least a portion or all of the above operations. In some embodiments, a method performed by the UE may include the UE performing the above operations. In some embodiments, a method performed by a base station or network element may include the base station or network element performing corresponding operations.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the disclosed embodiments can be obtained when the following detailed description is considered in conjunction with the following drawings, in which.

Figure 1:
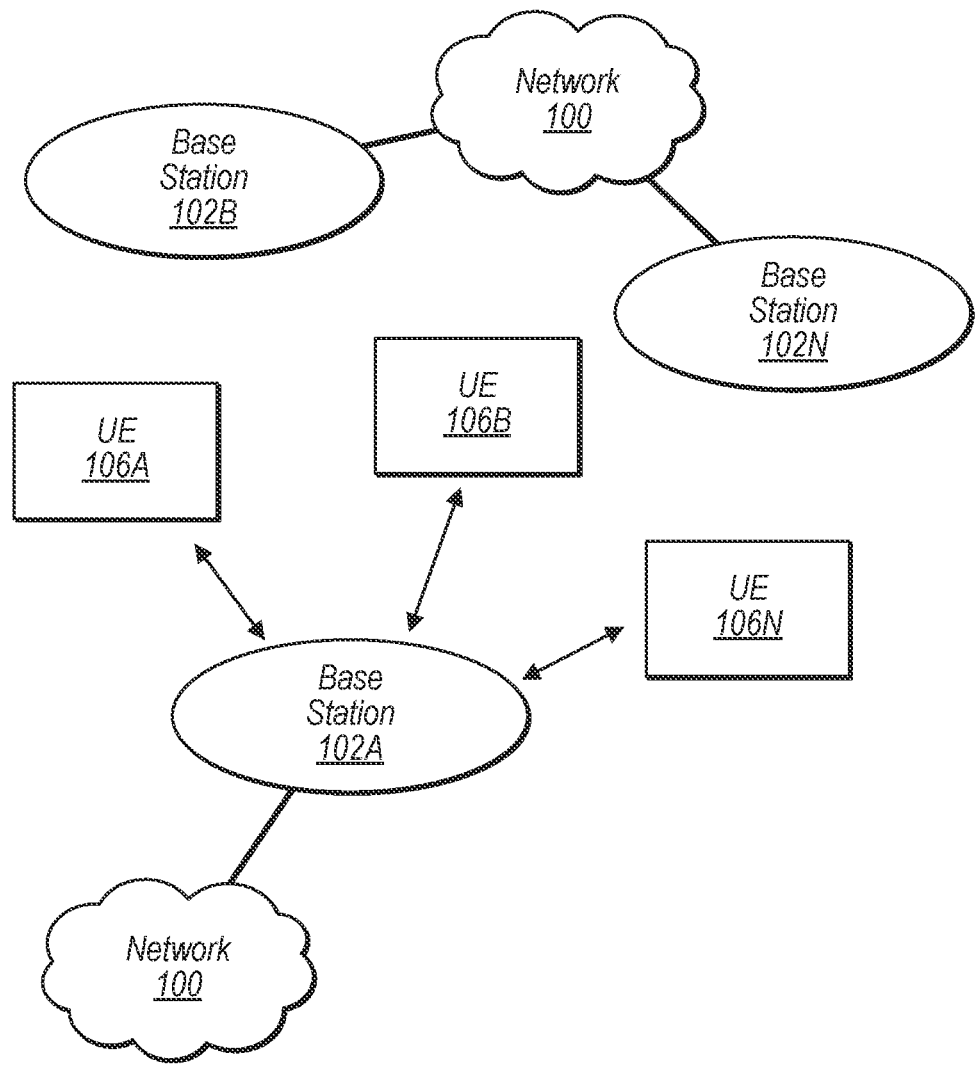
FIG. 1 illustrates an example wireless communication system, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms are used in the present Patent Application:
UE: User Equipment
BS: Base Station
ENB: eNodeB (Base Station)
LTE: Long Term Evolution
UMTS: Universal Mobile Telecommunications System
RAT: Radio Access Technology
RAN: Radio Access Network
E-UTRAN: Evolved UMTS Terrestrial RAN
CN: Core Network
EPC: Evolved Packet Core
MME: Mobile Management Entity
HSS: Home Subscriber Server
SGW: Serving Gateway
PS: Packet-Switched
CS: Circuit-Switched
EPS: Evolved Packet-Switched System
RRC: Radio Resource Control
IE: Information Element
QoS: Quality of Service
QoE: Quality of Experience
TFT: Traffic Flow Template
RSVP: Resource ReSerVation Protocol
API: Application programming interface. Terms The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Figure 2:
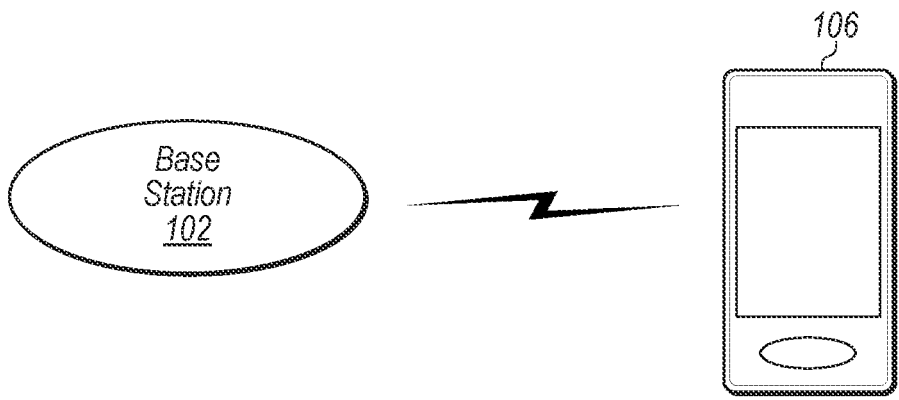
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102 which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102 may be a base transceiver station (BTS) or cell site (a "cellular base station"), and may include hardware that enables wireless communication with the UEs 106A through 106N.

The communication area (or coverage area) of the base station may be referred to as a "cell." The base station 102 and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), 6G, HSPA, 3GPP2 CDMA2000 (e.g., 1×RTT, 1×EV-DO, HRPD, eHRPD), etc. Note that if the base station 102 is implemented in the context of LTE, it may alternately be referred to as an 'eNodeB' or 'eNB'. Note that if the base station 102 is implemented in the context of 5G NR, it may alternately be referred to as 'gNodeB' or 'gNB'.

As shown, the base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. In particular, the cellular base station 102 may provide UEs 106 with various telecommunication capabilities, such as voice, SMS and/or data services.

Base station 102 and other similar base stations operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations 102B-N), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

In some embodiments, base station 102 may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
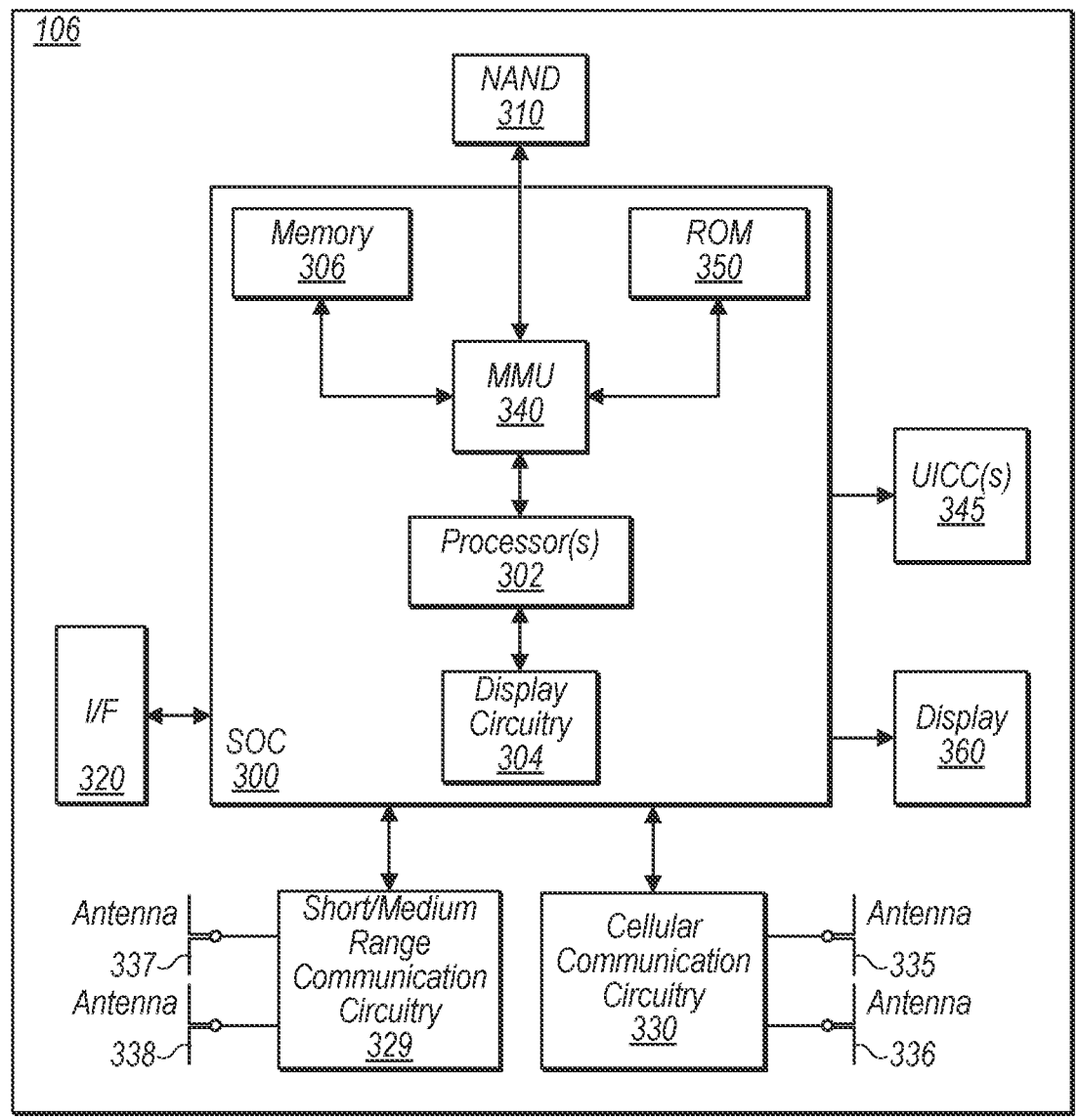
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity (DC) with the first and second network nodes has been established.

As described herein, the communication device 106 may include hardware and software components for implementing features for using multiplexing to perform transmissions according to multiple radio access technologies in the same frequency carrier (e.g., and/or multiple frequency carriers), as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements and/or processors. In other words, one or more processing elements or processors may be included in cellular communication circuitry 330 and, similarly, one or more processing elements or processors may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short range wireless communication circuitry 329 may include one or more ICs that are configured to perform the functions of short range wireless communication circuitry 329. In addition, each integrated circuit may include circuitry (e.g., first circuitry, second circuitry, etc.) configured to perform the functions of short range wireless communication circuitry 329.

Figure 4:
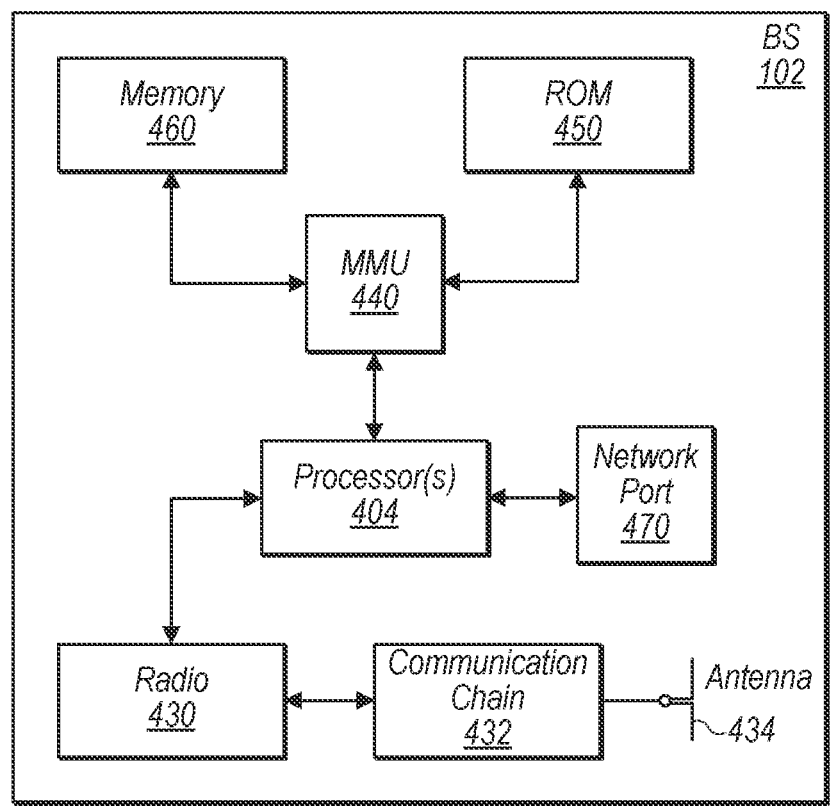
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs).

In addition, a UE capable of operating according to 5G NR may be connected to one or more TRPs within one or more gNB s.

The base station 102 may include at least one antenna 434, and possibly multiple antennas. The radio 430 and at least one antenna 434 may be configured to operate as a wireless transceiver and may be further configured to communicate with UE devices 106. The antenna 434 may communicate with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
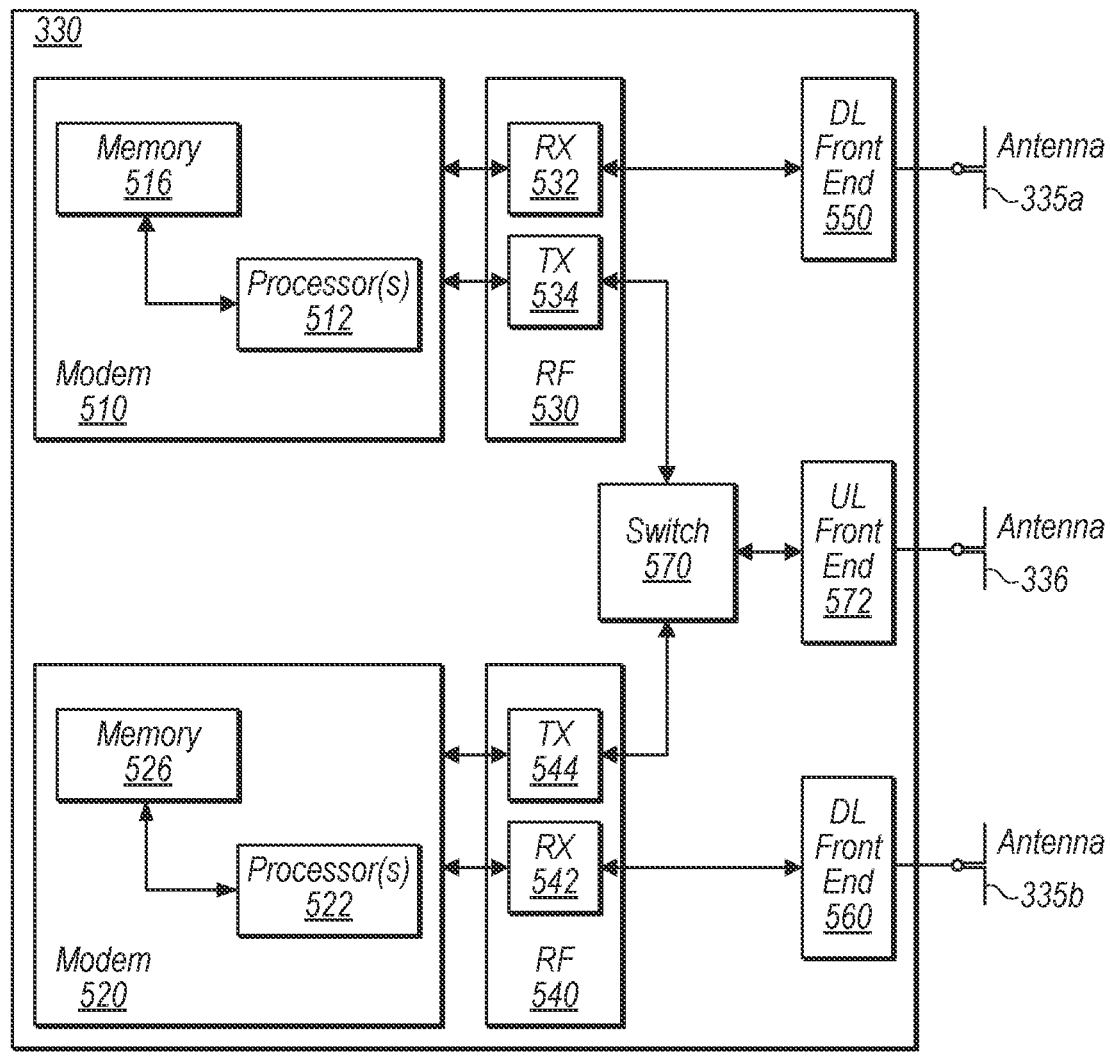
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, are also possible. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to transmit, via the first modem while the switch is in the first state, a request to attach to a first network node operating according to the first RAT and transmit, via the first modem while the switch is in a first state, an indication that the wireless device is capable of maintaining substantially concurrent connections with the first network node and a second network node that operates according to the second RAT. The wireless device may also be configured transmit, via the second radio while the switch is in a second state, a request to attach to the second network node. The request may include an indication that the wireless device is capable of maintaining substantially concurrent connections with the first and second network nodes. Further, the wireless device may be configured to receive, via the first radio, an indication that dual connectivity with the first and second network nodes has been established.

As described herein, the modem 510 may include hardware and software components for implementing features for using multiplexing to perform transmissions according to multiple radio access technologies in the same frequency carrier, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In some embodiments, processor(s) 512, 522, etc. may be configured to implement or support implementation of part or all of the methods described herein, e.g., by executing program instructions stored on a memory medium (e.g., a non-transitory computer-readable memory medium). Alternatively, the processor(s) 512, 522, etc. may be configured as a programmable hardware element, such as an FPGA, or as an ASIC, or a combination thereof. In addition, as described herein, processor(s) 512, 522, etc. may include one or more processing elements. Thus, processor(s) 512, 522, etc. may include one or more integrated circuits (ICs) that are configured to perform the functions of processor(s) 512, 522, etc. In addition, each integrated circuit may include circuitry (e.g., first circuitry, second circuitry, etc.) configured to perform the functions of processor(s) 512, 522, etc.

As described herein, the modem 520 may include hardware and software components for implementing features for using multiplexing to perform transmissions according to multiple radio access technologies in the same frequency carrier, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

Figure 6:
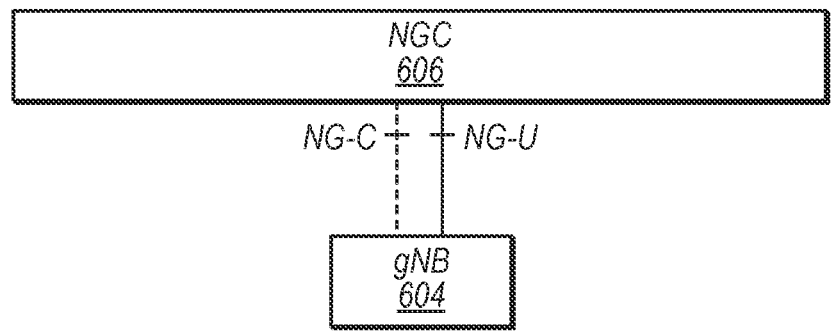
FIGS. 6 and 7 illustrate examples of a 5G NR base station (gNB), according to some embodiments.
Figure 7:
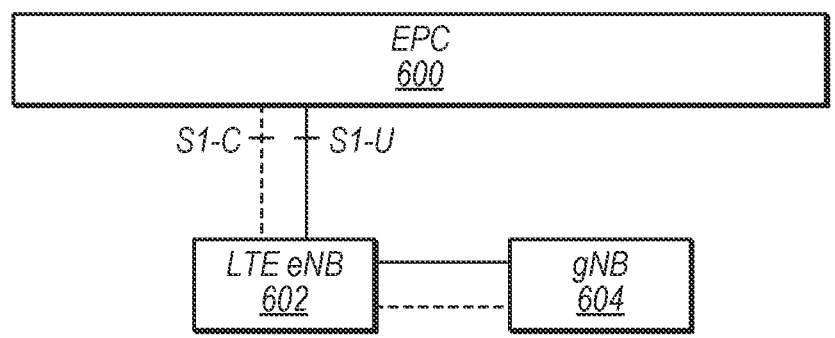

FIGS. 6-7—5G NR Architecture

In some implementations, fifth generation (5G) wireless communication will initially be deployed concurrently with other wireless communication standards (e.g., LTE). For example, whereas FIG. 6 illustrates a possible standalone (SA) implementation of a next generation core (NGC) network 606 and 5G NR base station (e.g., gNB 604), dual connectivity between LTE and 5G new radio (5G NR or NR), such as in accordance with the exemplary non-standalone (NSA) architecture illustrated in FIG. 7, has been specified as part of the initial deployment of NR. Thus, as illustrated in FIG. 7, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. In some instances, the gNB 604 may also have at least a user plane reference point with EPC network 600. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services. As will be appreciated, numerous other non-standalone architecture variants are possible.

Figure 8:
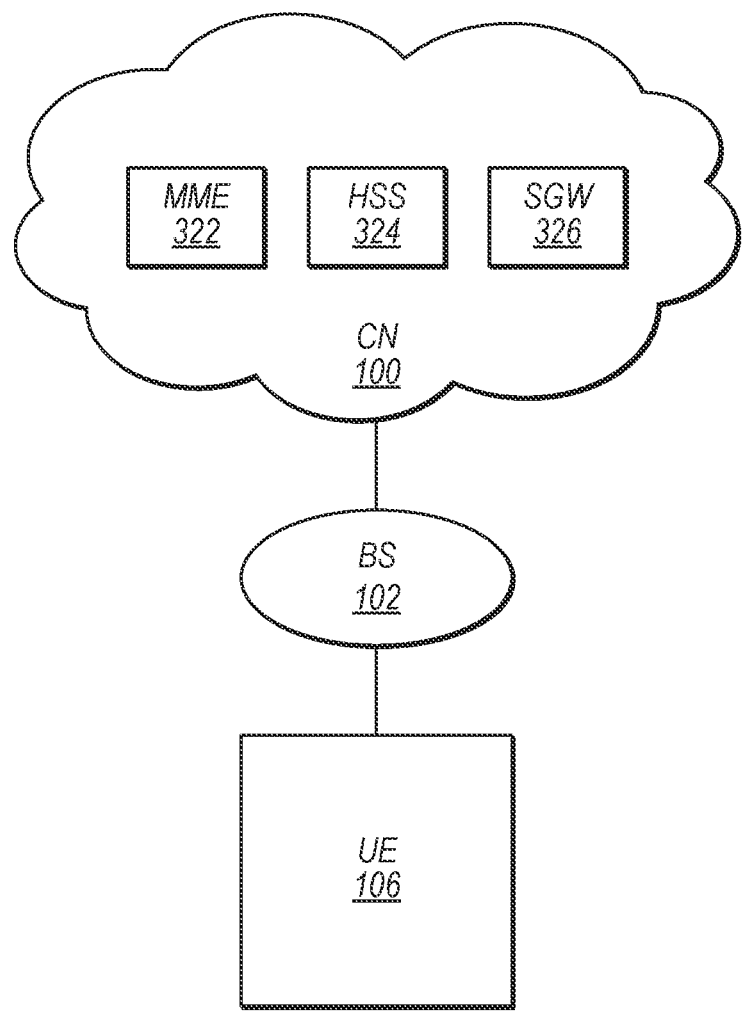
FIG. 8 illustrates an exemplary wireless network in communication with a UE, according to some embodiments.

FIG. 8—Wireless Communication System

FIG. 8 illustrates an example simplified portion of a wireless communication system. The UE 106 may be in communication with a wireless network, e.g., a radio access network (RAN), which may include one or more base stations (BS) 102 and may provide connection to a core network (CN) 100, such as an evolved packet core (EPC). The base station 102 may be an eNodeB and/or gNB (e.g., a 5G or NR base station) or other type of base station. The UE 106 may communicate in a wireless manner with the base station 102. In turn, the base station 102 may be coupled to a core network 100. As shown, the CN 100 may include a mobility management entity (MME) 322, a home subscriber server (HSS) 324, and a serving gateway (SGW) 326. The CN 100 may also include various other devices known to those skilled in the art.

Operations described herein as being performed by the wireless network may be performed by one or more of the network devices shown in FIG. 8, such as one or more of the base station 102 or the CN 100, and/or the MME 322, HSS 324, or SGW 326 in the CN 100, among other possible devices. Operations described herein as being performed by the radio access network (RAN) may be performed, for example, by the base station 102, or by other components of the RAN usable to connect the UE and the CN.

NR MIMO Operation Enhancement

Multiple input multiple output (MIMO) communication may be used in cellular communication, e.g., in LTE, NR, etc. (although it may also be used in other types of wireless communication, such as wireless local area network (WLAN) communication).

Cellular base stations (e.g., eNBs or gNBs) and UEs may communicate signaling information (e.g., control information) regarding MIMO communication. For example, signaling information regarding uplink or downlink MIMO communication may be transmitted between the UE and the base station. While embodiments described herein relate to uplink communication and related signaling, they may also be applied to downlink communication and relate signaling, with appropriate changes. Additionally, various terms herein may be described with respect to NR, but they may also be applicable to other communication standards, e.g., LTE or future cellular standards, with appropriate changes.

In some embodiments, uplink MIMO communication may be configured to be codebook based or non-codebook based, as desired. For codebook based MIMO communication, the network (or base station) may configure reference signal resource sets (e.g., sounding reference signal (SRS)-ResourceSet) with usage set to "codebook". In some embodiments, up to two SRS resources can be configured per SRS-ResourceSet.

In physical uplink shared channel (PUSCH)-Config, the network (e.g., the base station) may provide a configuration to the UE including:
codebookSub set ENUMERATED {fullyAndPartialAndNonCoherent, partialAndNonCoherent, nonCoherent}; and
maxRank INTEGER (1-4).

The network may also specify further configuration information in the downlink control information (DCI). For example, in DCI, the network (e.g., the base station) may indicate:
SRI (SRS resource indicator): one of the SRS resources; and
Precoding information and number of layers, e.g., including TPMI and rank information.

In some embodiments, uplink MIMO communication may be configured to be non-codebook based. For example, the network (e.g., the base station) may configure the SRS-ResourceSet with usage set to "nonCodebook". In this embodiment, up to four SRS resources may be configured per SRS-ResourceSet. Additionally, in the DCI, the network (e.g., the base station) can indicate SRI (SRS resource indicator), e.g., selecting or specifying a subset of the (up to) four SRS resources.

However, codebook based uplink MIMO operation may also be enhanced by certain aspects, e.g., in order to support uplink full power transmission. Accordingly, codebook based MIMO operation could be enhanced to up to four SRS resources for configuration per SRS-ResourceSet (or more). Additionally, each SRS resource can be configured with a different number of ports, as desired.

Various embodiments described herein may related to: codebook based uplink MIMO operation, nonCodebook based uplink MIMO operation, Codebook+antennaSwitching uplink MIMO operation, four port partial-coherent UE, and/or four port full-coherent UE, among other possibilities.

Codebook Based Uplink MIMO Operation

In some embodiments, for codebook based uplink MIMO operation, when the "SRS resource indicator" field is not configured in the uplink DCI, the UE may determine transmission configuration in various ways. For example, the UE may not be expected to be configured with "precoding information and number of layers" in the same uplink DCI and the UE may be expected to perform single layer PUSCH transmission. For example, the UE may not receive rank information and may default to single layer transmission. Alternatively, the UE may be configured with "precoding information and number of layers" and may use the indicated number of layers, but may default to using the SRS resource corresponding to SRI=0, since the SRS resource may not have been indicated in the uplink DCI.

In some embodiments, the SRS resource indicator may be indicated using the following formula:

$$\left\lceil \log_2\left( \sum_{k=1}^{min\{L_{max},N_{SRS}\}} \binom{N_{SRS}}{k} \right) \right\rceil \text{ or } \lceil \log_2(N_{SRS}) \rceil \text{ bits,}$$

where Nsrs is the number of configured SRS resources in the SRS resource set, e.g., configured by higher layer parameter srs-ResourceSetToAddModList, and associated with the higher layer parameter usage of value 'codeBook' or 'nonCodeBook'.

In some embodiments, for codebook based uplink MIMO operation, when more than one SRS resources are configured in SRS-ResourceSet with usage set to "codebook", the UE may be expected to be configured with "SRS resource indicator" (SRI) field in the uplink DCI. Thus, in at least one embodiment, when there are a plurality of SRS resources in one or more SRS resource sets, the DCI may include a "SRS resource indicator" field that indicates which SRS resource(s) the UE should use for transmission (e.g., for sounding or during data transmission).

In some embodiments, for codebook based uplink MIMO operation, when more than one SRS resources are configured in SRS-ResourceSet with usage set to "codebook", if the UE is not configured with "SRS resource indicator" field in any uplink DCI, the UE may be expected to transmit only the SRS resource corresponding to SRI=0. In other words, when the SRI is not specified by the base station (e.g., when there are more than one SRS resources available and during "codebook" configuration), the UE may determine that the assigned SRI is 0 (e.g., use SRI=0 as a default value). Accordingly, the UE may use the SRS resource corresponding to SRI 0 for transmission (e.g., sounding or data transmission, as desired).

In some embodiments, for uplink full power transmission with codebook based uplink MIMO operation, when more than one SRS resource are configured in SRS-ResourceSet with usage set to "codebook" and SRS resources are configured with different number of ports, if the UE is not configured with "SRS resource indicator" field in any uplink DCI:
the UE may assume that SRI is the SRS resource with lowest SRI among all SRS resources configures with "codebook" having the highest number of ports; and
the UE may not be required to transmit the other SRS resources.

For example, in some embodiments, if there are SRS resources assigned as SRI=0 with 2 ports, SRI=1 with 4 ports, and SRI=2 with 4 ports, the UE may select SRI=1 because it is the lowest SRI (1) having the highest number of ports (4).

Non-Codebook Based Uplink MIMO Operation

In some embodiments, for nonCodebook based uplink MIMO operation, when "SRS resource indicator" field is not configured in the uplink DCI, the UE may be expected to perform single layer PUSCH transmission based on SRI=0. For example, similar to embodiments described above, the UE may default to using the SRS resource with the lowest assigned resource ID value (e.g., SRI=0) when no SRI field is present. Thus, the UE may default to the lowest available SRI value for transmission when the SRS resource is not specified in the DCI. Additionally, for nonCodebook, the UE may default to the use of only a single layer, e.g., when rank information is not provided.

In some embodiments, the UE may or may not be configured with "Precoding information and number of layers" in the same uplink DCI, which may be used to determine which parameters to use.

In some embodiments, for nonCodebook based Uplink MIMO operation, when more than one SRS resources are configured in SRS-ResourceSet with usage set to "nonCodebook", the UE may be expected to be configured with "SRS resource indicator" field in the uplink DCI. Otherwise, when a single SRS resource is configured in SRS-ResourceSet, the "SRS resource indicator" field may not be configured, and the UE may assume single layer PUSCH transmission with SRI=0.

In some embodiments, for nonCodebook based uplink MIMO operation, when more than one SRS resources are configured in SRS-ResourceSet with usage set to "nonCodebook", if the UE is not configured with "SRS resource indicator" field in any uplink DCI, the UE may be expected to transmit only the SRS resource corresponding to SRI=0.

Thus, in some embodiments, similar to those described above, the UE may use a SRI field provided by the base station (e.g., within the uplink DCI) to determine which SRS resource(s) to use for uplink transmission. When it is not configured, the UE may use a default value or algorithm to determine which SRI to use for transmission. In various embodiments, the default value may be SRI=0 or a lowest available SRI among the set of assigned SRS resources, although other embodiments are also envisioned. In some embodiments, the UE may only transmit on the SRS resource that it is assigned or has determined when no SRI is indicated, although in other embodiments, the UE may be configured to transmit on additional SRS resources, as desired.

Four Port Partial-Coherent UE

When a UE is capable of four port partial coherent (e.g., provided in UE capability information to the network), the network (e.g., the base station) may configure two port operation, e.g., by requesting the UE to sound 2 port SRS, and the UE may not be sure what coherency should be used in the two port mode. Accordingly, the UE may determine the coherency in multiple different ways, e.g., based on SRS resource assignment values (e.g., codebookSub set fields) for four ports, based on a separate fields or parameters, e.g., in PUSCH-config, for two ports (e.g., codebookSubset2Port fields), and/or based on a default assumption (e.g., which may be specified in the relevant standard), among other possibilities.

For example, in some embodiments, for a four port partial-coherent UE (e.g., where puschTransCoherence="partialCoherent"), the network (e.g., the base station) may configure the UE to operate in four port partial-coherent PUSCH operation, e.g., with full power transmission mode 2. In some embodiments, when both two port SRS resource and four port SRS resource are configured in the same SRS resource set, the coherency assumption the two port SRS resource can be based on:
1: codebookSubset in PUSCH-Config—four port SRS is always partialAndNonCoherent, codebookSubset="partialAndNonCoherent" (two port SRS is nonCoherent), and codebookSubset="fullyAndPartialAndNonCoherent" (two port SRS is fullyAndPartialAndNonCoherent);
2: a separate field may be added to PUSCH-Config, e.g., codebookSubset2Port ENUMERATED {fullyAndPartialAndNonCoherent, nonCoherent}; or
3: hardcoded in the specification, e.g., two port SRS is nonCoherent or two port SRS is fullyAndPartialAndNonCoherent.

Four Port Full-Coherent UE

When a UE is capable of four port full coherent (e.g., provided in UE capability information to the network), the network (e.g., the base station) can still configure the UE to operate in partial-coherent, e.g., as a downgraded operation. When the network (e.g., the base station) also configures two port operation, e.g., by requesting the UE to sound 2 port SRS, the UE may not be sure whether the network is requesting the UE to operate in non-coherent or full-coherent.

Accordingly, in some embodiments, for a four port full-coherent UE (e.g., where puschTransCoherence="fullCoherent"), the network (e.g., the base station) may configure the UE to operate in four port partial-coherent PUSCH operation, e.g., with full power transmission mode 2.

When both two port SRS resources and four port SRS resources are configured in the same SRS resource set, the coherency assumption of the two port SRS resources can be based on:
1: separate field added to PUSCH-Config (e.g., codebookSubset2Port ENUMERATED {fullyAndPartialAndNonCoherent, nonCoherent}; or
2: hardcoded in the specification, e.g., two port SRS is nonCoherent or two port SRS is fullyAndPartialAndNonCoherent.

For the case when the network configures the UE to operate in full coherent mode, the UE may simply operate in full coherent mode when two port operation is requested.

Codebook+Antenna Switching Uplink MIMO

In some embodiments, for "antennaSwitching", up to two SRS resource sets can be configured with "antennaSwitching". Additionally, in some embodiments, to reduce the overhead, the network (e.g., the base station) can configure the UE to operate in both "Codebook" and "antennaSwitching" mode.

In some embodiments, when the network (e.g., the base station) configures SRS-ResourceSet, the SRS-ResourceSet may have multiple usage, such as "Codebook+antennaSwitching" (e.g., the same resource sets(s) may be used for both codebook and antennaSwitching transmission. The network and UE may address how these resources are used in a variety of ways.

For example, in some embodiments, with usage of both "Codebook" and "antennaSwitching", the network may only configure one SRS-ResourceSet with the same usage. Having only one SRS resource set with the same usage may reduce the need for additional signaling.

Alternatively, or additionally, in some embodiments, the network (e.g., the base station) may configure SRS-ResourceSet with usage of both "Codebook" and "antennaSwitching" and more than one SRS-ResourceSet may be assigned the same usage (e.g., for both codebook and resource set). Accordingly, a SRS resource set indicator (SRSI) can be introduced into uplink DCI to indicate the SRS resource set and/or then indicate the SRI within the SRS resource set. Accordingly, the UE may be configured to determine the SRS resource set from the SRSI field. The UE may determine the order of the resource sets in a variety of manners. In one embodiment, SRSI=0 may correspond to the SRS resource set with the lowest SRS resource index (SRI), SRSI=1 may correspond to the SRS resource set with the second lowest SRI, etc. The UE may thus determine the SRS resources to use from the SRSI and/or SRI (e.g., which may correspond to the specified SRS resource set) for transmission.

In some embodiments, rather than introducing an SRSI field, the network (e.g., the base station) may indicate the SRS resource set/specific SRS resources using the SRI field. The UE may determine the appropriate SRS resource set in a variety of ways. For example, when the network (e.g., the base station) configures SRS-ResourceSet with usage of both "Codebook" and "antennaSwitching" and the network (e.g., the base station) configures more than one SRS-ResourceSet with the same usage, the SRI in uplink DCI may map to the SRS resource in SRS-ResourceSet in one or more the following ways:

1: in the order of SRS resource index; or
2: first in the order of SRS resource set index, then for the same SRS Resource set index in the order of SRS resource index.

Figures 9, 10:
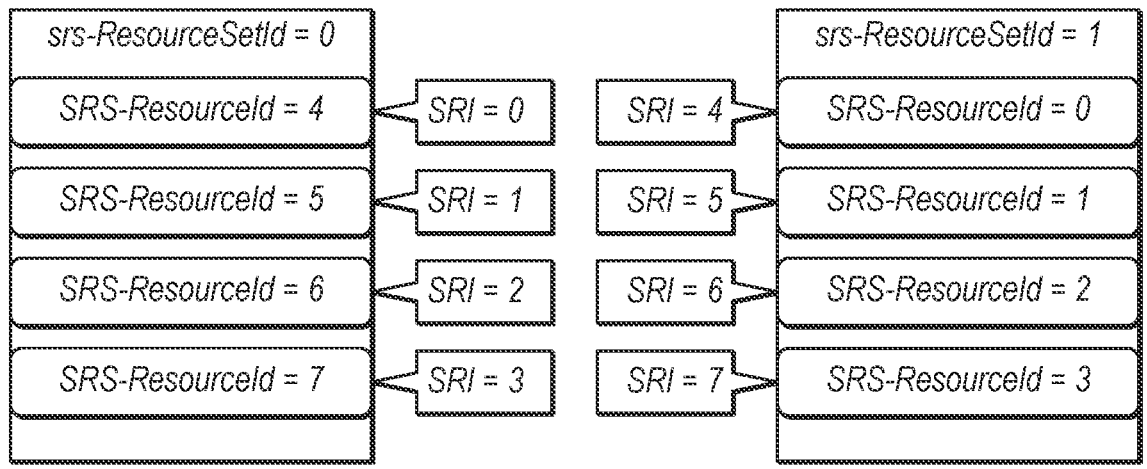
FIG. 9 illustrates an exemplary assignment of SRS resource identifier across two SRS resource sets, according to some embodiments.
FIG. 10 illustrates an exemplary guard interval for SRS resources, according to some embodiments.

FIG. 9 illustrates this second example. In particular, FIG. 9 illustrates the first srs-ResourceSet (ID=0), which is selected first, and within that Set, the SRS-ResourceId is set in order, so ResourceId=4 corresponds to SRI 0. After completing the first set (ID=0) corresponding to SRI 0-3, the second set is used (ID=1), which assigns SRI 4-7 corresponding to ResourceIds 0-3. In the first example, the SRI 0 would correspond to SRS resource ID 0 rather than SRS resource ID 4 as shown in FIG. 9.

Thus, the UE may determine SRI for multiple resource sets with a priority of SRS resource numbers first or SRS resource set ID first, followed by SRS resource IDs, among various possibilities.

In some embodiments, when the network (e.g., the base station) configures SRS-ResourceSet with usage of both "Codebook" and "antennaSwitching", the UE can be configured with one or more SRS resources with more than 1 port. In some embodiments, the number of ports of different SRS resources may be the same. In such embodiments, because the number of ports remains the same for each SRS resource, additional signaling may not be necessary.

Alternatively, in some embodiments, when the network (e.g., the base station) configures SRS-ResourceSet with usage of both "Codebook" and "antennaSwitching", and, at the same time, if UL full power transmission mode 2 is also configured, the UE can be configured with SRS resources with more than one port, and the number of ports of different SRS resources can be different. Thus, when the number of ports can vary, signaling between the UE and base station as well as UE transmission behavior may be handled in a variety of ways.

In some embodiments, when the network configures SRS-ResourceSet with usage of both "Codebook" and "antennaSwitching", for uplink full power transmission, the maximum number of SRS resources per SRS resource set may be relaxed.

In some embodiments, the maximum number of SRS-ResourceSet may be set to two. Accordingly, for each antenna switch, there may be four SRS resources for codebook based UL full power transmission. For example, for 2T4R (two transmission, four receive antennas), SRS resources per SRS resource set may be relaxed to 4 (e.g., 2 switch, so total 8 SRS resources); for 2T6R, SRS resources per SRS resource set may be relaxed to 6 (e.g., 3 switch, so total 12 SRS resources); 2T8R, SRS resources per SRS resource set may be relaxed to 8 (e.g., 4 switch, so total 16 SRS resources); and 4T8R, SRS resources per SRS resource set may be relaxed to 4 (e.g., 2 switch, so total 8 SRS resources).

In some embodiments, when the network (e.g., the base station) configures SRS-ResourceSet with usage of both "Codebook" and "antennaSwitching", e.g., for uplink full-power transmission, the maximum number of SRS resources per SRS resource set may be relaxed. For example: for 1T2R, relaxed from 2 to 4; for 1T4R, relaxed from 4 to 8; for 1T6R, relaxed from 6 to 12; for 1T8R, relaxed from 8 to 16; for 2T4R, relaxed from 2 to 4; for 2T6R, relaxed from 3 to 6; for 2T8R, relaxed from 4 to 8; for 4T8R, relaxed from 2 to 4.

NonCodebook+Antenna Switching Uplink MIMO

In some embodiments, similar to codebook examples above, when the network (e.g., the base station) configures SRS-ResourceSet, SRS-ResourceSet can have multiple usage at the same time, for example, "nonCodebook+antennaSwitching".

In some embodiments, for SRS configuration, with the non-codebook SRS sounding from the same antennas, no guard internal may be needed between the SRS resources (e.g., UE transmission on the SRS resources). However, for SRS sounding from different antennas, a minimum guard interval may be guaranteed between any two SRS transmitted from different antenna For SRS configuration. For example, the guard interval shown in FIG. 10 may be used.

In some embodiments, each SRS resource set may be assumed to be transmitted from one set of antennas. Accordingly, for 1T2R and 2T4R: two SRS resource sets may be configured; for 2T6R: three SRS resource sets may be configured; for 1T4R, 2T8R: 4 SRS resource sets may be configured; for 1T6R: 6 SRS resource sets may be configured; 1T8R: 8 SRS resource sets may be configured. Within each SRS resource set, up to four SRS resources can be configured for UE to perform nonCodebook based sounding from the selected antennas. In some embodiments, the resource sets shown in FIG. 9 may be applicable for 4T8R.

Figure 11:
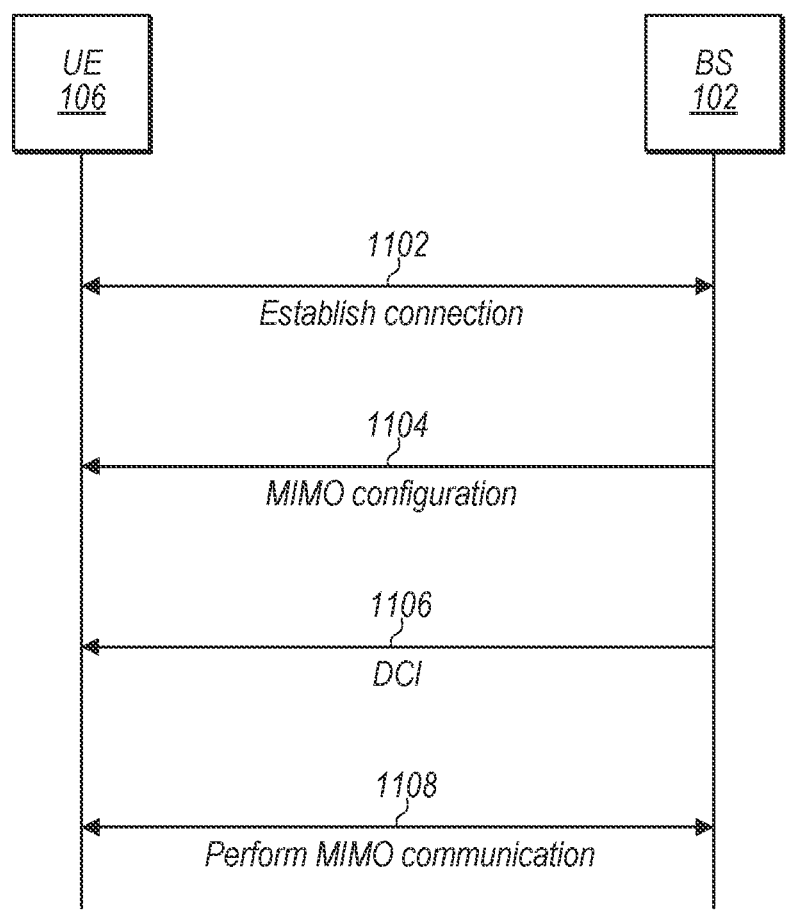
FIG. 11 is a flow chart diagram illustrating an example method for MIMO configuration, according to some embodiments.

FIG. 11—MIMO Signaling

FIG. 11 illustrates exemplary techniques for configuring MIMO communication. Aspects of the method of FIG. 11 may be implemented by a wireless device, such as the UE(s) 106, in communication with a network, e.g., via one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 302, baseband processor(s), processor(s) associated with communication circuitry, etc., among various possibilities) may cause the UE to perform some or all of the illustrated method elements. Similarly, one or more processors (or processing elements) of the BS (e.g., processor(s) 404, baseband processor(s), processor(s) associated with communication circuitry, etc., among various possibilities) may cause the UE to perform some or all of the illustrated method elements.

Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may omitted. Additional method elements may also be performed as desired. As shown, the method may operate as follows.

In 1102, a UE (e.g., UE 106) may establish communication with a network (e.g., via base station 102), according to some embodiments. For example, the UE may perform an attach procedure with the base station. In some embodiments, the UE may provide capability information to the base station. For example, the UE may indicate various MIMO capabilities, number of available antennas, number of available ports, coherency (e.g., non-coherent, partial coherent, full coherent), etc.

In 1104, the UE may receive MIMO configuration information from the network, e.g., based on the UE capability information. The MIMO configuration information may be received in a single message or a plurality of messages and/or at a single time or over a length of time, as desired. In some embodiments, at least a portion of the MIMO configuration information may be transmitted in radio resource control (RRC) signaling. The MIMO configuration may specify the manner in which the UE performs communication with the base station, e.g., it may specify uplink and/or downlink MIMO configuration information for performing various uplink and/or downlink communication with the base station. In some embodiments, at least a portion of the MIMO configuration information may be provided as part of PUSCH configuration (e.g., PUSCH-Config).

In some embodiments, the MIMO configuration may specify sounding reference signal (SRS) resources. For example, the MIMO configuration may specify one or more SRS resources within one or more SRS resource sets. For example, the MIMO configuration may specify 2, 4, or more SRS resources per SRS resource set.

In some embodiments, the MIMO configuration may specify whether the MIMO communication (e.g., uplink MIMO communication) is set to "codebook" or "nonCodebook". In some embodiments, the MIMO configuration may specify parameters for antenna switching. Antenna switching may be enabled concurrently with codebook or non-codebook MIMO configurations. For example, the MIMO configuration may specify "codebook+antenna switching" or "non-codebook+antenna switching", as desired.

In some embodiments, the MIMO configuration may specify port configuration (e.g., within PUSCH configuration). For example, port configuration may include a number of ports as well as coherency (e.g., non-coherent, partial and non-coherent, fully and partial and non-coherent, full coherent, etc.). In some embodiments, a first subset of the ports may have a first configuration and a second subset of the ports may have a second configuration. For example, for a four port configuration, the MIMO configuration may allow a first configuration for two ports (e.g., non-coherent) and a second configuration for two other ports (e.g., fully and partial and non-coherent), e.g., for SRS resources.

In 1106, the UE may receive downlink control information (DCI) which may specify MIMO parameters that may augment or change the received MIMO configuration (e.g., uplink MIMO configuration). In some embodiments, the DCI is an uplink DCI (e.g., an uplink DCI grant). The MIMO parameters (e.g., included in the DCI) may specify which SRS resources the UE should use (e.g., selecting one or more SRS resources from the plurality of configured SRS resources specified by the MIMO configuration), e.g., during uplink transmission. For example, as discussed above, the MIMO parameters of the DCI may specify SRI, SRSI, and/or any number of fields to specify the desired SRS resource(s) (e.g., of the set of available SRS resources already configured for the UE in the MIMO configuration) the UE should use for transmission. Additionally, or alternatively, the DCI (e.g., the MIMO parameters specified by the DCI) may also include precoding information and/or number of layers (e.g., transmit precoding matrix indicator TPMI and/or rank information). Other MIMO parameters are also envisioned (e.g., included in the DCI or otherwise). Thus, the UE may receive MIMO parameters (e.g., in the DCI or otherwise) that modify or augment the MIMO configuration. These MIMO parameters may be configured in a more dynamic manner than the MIMO configuration, e.g., they may be more adaptive to channel conditions and may be modified by the base station as the channel conditions change.

In 1108, the UE may perform MIMO communication (e.g., uplink MIMO communication) with the base station according to the MIMO configuration and/or MIMO parameters in the DCI. For example, the UE may perform uplink data communication according to the configuration, e.g., using the specified precoding information, layer information, rank information, SRS resources, etc. The UE may transmit SRS in the specified SRS resources, which may allow the UE and the base station to feedback and adjust uplink transmission configuration (e.g., uplink MIMO configuration), such as by adjusting future uplink DCI parameters/fields (e.g., uplink MIMO parameters, such as those described herein). However, the UE may be configured to perform communication with the base station without transmitting data (e.g., in addition to the SRSs). The MIMO communication may include various sounding procedures using the assigned SRS resources. Thus, the MIMO communication may include SRS transmissions without additional data transmission. Alternatively, the SRS may be transmitted at the same time or concurrently with data in a data transmission, as desired.

EXEMPLARY EMBODIMENTS

The following descriptions provide exemplary embodiments corresponding to various embodiments described herein, e.g., such as corresponding to the method of FIG. 11.

Example 1. A method for operating a user equipment (UE), comprising: establishing a cellular connection with a base station; receiving multiple input, multiple output (MIMO) uplink configuration information from the base station, wherein the MIMO configuration information indicates a plurality of sounding reference signal (SRS) resources; receiving downlink control information (DCI) from the base station, wherein the DCI specifies a plurality of MIMO parameters; and performing uplink MIMO communication with the base station according to the MIMO configuration and the plurality of MIMO parameters.

Example 2. The method of example 1, wherein one or more of the plurality of MIMO parameters specify at least a subset of the plurality of SRS resources for performing uplink MIMO communication, wherein performing uplink MIMO communication includes using the at least a subset of the plurality of SRS resources specified in the DCI.

Example 3. The method of example 1, wherein a sounding reference signal (SRS) resource indicator field is not present in the DCI, wherein performing uplink MIMO communication includes performing single layer physical uplink shared channel (PUSCH) transmission based on the SRS recourse indicator field not being present in the DCI.

Example 4. The method of example 1, wherein a sounding reference signal (SRS) resource indicator field is not present in the DCI, wherein performing uplink MIMO communication is performed using a SRS resource indicator field value of 0 in response to the SRS resource indicator field not being present in the DCI.

Example 5. The method of example 1, wherein the MIMO uplink configuration information specifies codebook uplink MIMO operation.

Example 6. The method of example 5, wherein at least one of the plurality of parameters include a SRS resource indicator field indicating the at least a subset of the plurality of SRS resources.

Example 7. The method of example 5, wherein the plurality of SRS resources include different numbers of ports, wherein a sounding reference signal (SRS) resource indicator field is not present in the DCI, wherein performing uplink MIMO configuration is performed using a SRS resource having a lowest SRS resource indicator field value among the SRS resources of the plurality of SRS resources having a highest number of ports, in response to the SRS resource indicator field not being present in the DCI.

Example 8. The method of example 1, wherein the MIMO configuration or the DCI configures the UE to operate in four port partial-coherent operation and two port SRS resources and four port SRS resources are configured in a same SRS resource set, wherein the UE operates four ports in partial and non-coherent.

Example 9. The method of example 8, wherein the UE operates two ports in non coherent based on a parameters value of "partialAndNonCoherent".

Example 10. The method of example 8, wherein the UE operates two ports in fully and partial and non coherent based on a parameter value of "fullyAndPartialAndNonCoherent".

Example 11. The method of example 8, wherein the UE operates two ports based on a parameter value corresponding to the two port operation within a field in physical uplink shared channel (PUSCH) configuration.

Example 12. The method of example 8, wherein the UE operates two ports based on a preconfigured assumption of the UE.

Example 13. The method of example 1, wherein the MIMO configuration or the DCI configures the UE to operate in four port full-coherent operation and two port SRS resources and four port SRS resources are configured in a same SRS resource set, wherein the UE operates four ports in full coherent.

Example 14. The method of example 13, wherein the UE operates two ports based on a parameter value corresponding to the two port operation within a field in physical uplink shared channel (PUSCH) configuration.

Example 15. The method of example 13, wherein the UE operates two ports based on a preconfigured assumption of the UE.

Example 16. The method of example 1, wherein the MIMO uplink configuration information specifies both codebook and antenna switching uplink MIMO operation.

Example 17. The method of example 16, wherein the plurality of SRS resources are configured for multiple usage for codebook and antenna switching.

Example 18. The method of example 16, wherein only a single SRS resource set is configured for both codebook and antenna switching.

Example 19. The method of example 16, wherein a plurality of SRS resource sets is configured for both codebook and antenna switching.

Example 20. The method of example 19, wherein the DCI specifies a SRS resource set indicator (SRSI) specifying a first SRS resource set.

Example 21. The method of example 19, wherein the DCI specifies a SRS resource indicator, wherein the UE determines the SRS resource from the SRS resource indicator by assigning SRI values to SRS resources of both a first SRS resource set and a second SRS resource set.

Example 22. The method of example 16, wherein the plurality of SRS resources use a same number of ports.

Example 23. The method of example 16, wherein the plurality of SRS resources use a different number of ports.

Example 24. The method of example 1, wherein the MIMO uplink configuration information specifies both non codebook and antenna switching uplink MIMO operation.

Example 25. The method of example 24, wherein the plurality of SRS resources are configured for multiple usage for non codebook and antenna switching.

Example 26. The method of example 24, wherein performing uplink MIMO communication uses a guard interval between SRS resources when sounding using different antennas.

Example 27. The method of example 24, wherein performing uplink MIMO communication does not a use a guard interval between SRS resources when sounding using same antennas.

Example 28. An apparatus, comprising: one or more processors, wherein the one or more processors are configured to cause a UE to perform the method of any of examples 1-27.

Example 29. A non-transitory, computer-accessible memory medium storing program instructions executable by one or more processors of a UE to perform the method of any of examples 1-27.

30. A user equipment (UE), comprising: a plurality of antennas; wireless communication circuitry coupled to the plurality of antennas; and one or more processors coupled to the wireless communication circuitry, wherein the one or more processors are configured to cause the UE to perform the method of any of examples 1-27.

Example 31. A method for operating a base station, comprising: establishing a cellular connection with a user equipment (UE); transmitting multiple input, multiple output (MIMO) uplink configuration information to the UE, wherein the MIMO configuration information indicates a plurality of sounding reference signal (SRS) resources; transmitting downlink control information (DCI) to the UE, wherein the DCI specifies a plurality of MIMO parameters; and performing uplink MIMO communication with the UE according to the MIMO configuration and the plurality of MIMO parameters.

Example 32. The method of example 31, wherein one or more of the plurality of MIMO parameters specify at least a subset of the plurality of SRS resources for performing uplink MIMO communication, wherein performing uplink MIMO communication includes using the at least a subset of the plurality of SRS resources specified in the DCI.

Example 33. The method of example 31, wherein a sounding reference signal (SRS) resource indicator field is not present in the DCI, wherein performing uplink MIMO communication includes receiving single layer physical uplink shared channel (PUSCH) transmission based on the SRS recourse indicator field not being present in the DCI.

Example 34. The method of example 31, wherein a sounding reference signal (SRS) resource indicator field is not present in the DCI, wherein performing uplink MIMO communication is performed based on a SRS resource indicator field value of 0 in response to the SRS resource indicator field not being present in the DCI.

Example 35. The method of example 31, wherein the MIMO uplink configuration information specifies codebook uplink MIMO operation.

Example 6. The method of example 35, wherein at least one of the plurality of parameters include a SRS resource indicator field indicating the at least a subset of the plurality of SRS resources.

Example 37. The method of example 35, wherein the plurality of SRS resources include different numbers of ports, wherein a sounding reference signal (SRS) resource indicator field is not present in the DCI, wherein performing uplink MIMO configuration is performed based on a SRS resource having a lowest SRS resource indicator field value among the SRS resources of the plurality of SRS resources having a highest number of ports, in response to the SRS resource indicator field not being present in the DCI.

Example 38. The method of example 31, wherein the MIMO configuration or the DCI configures the UE to operate in four port partial-coherent operation and two port SRS resources and four port SRS resources are configured in a same SRS resource set, wherein the UE operates four ports in partial and non-coherent.

Example 39. The method of example 38, wherein the UE operates two ports in non coherent based on a parameters value of "partialAndNonCoherent".

Example 40. The method of example 38, wherein the UE operates two ports in fully and partial and non coherent based on a parameter value of "fullyAndPartialAndNonCoherent".

Example 41. The method of example 38, wherein the UE operates two ports based on a parameter value corresponding to the two port operation within a field in physical uplink shared channel (PUSCH) configuration.

Example 42. The method of example 38, wherein the UE operates two ports based on a preconfigured assumption of the UE.

Example 43. The method of example 31, wherein the MIMO configuration or the DCI configures the UE to operate in four port full-coherent operation and two port SRS resources and four port SRS resources are configured in a same SRS resource set, wherein the UE operates four ports in full coherent.

Example 44. The method of example 43, wherein the UE operates two ports based on a parameter value corresponding to the two port operation within a field in physical uplink shared channel (PUSCH) configuration transmitted by the base station.

Example 45. The method of example 43, wherein the UE operates two ports based on a preconfigured assumption of the UE.

Example 46. The method of example 31, wherein the MIMO uplink configuration information specifies both codebook and antenna switching uplink MIMO operation.

Example 47. The method of example 46, wherein the plurality of SRS resources are configured for multiple usage for codebook and antenna switching.

Example 48. The method of example 46, wherein only a single SRS resource set is configured for both codebook and antenna switching.

Example 49. The method of example 46, wherein a plurality of SRS resource sets is configured for both codebook and antenna switching.

Example 50. The method of example 49, wherein the DCI specifies a SRS resource set indicator (SRSI) specifying a first SRS resource set.

Example 51. The method of example 49, wherein the DCI specifies a SRS resource indicator (SRI), wherein SRI values are assigned to SRS resources of both a first SRS resource set and a second SRS resource set.

Example 52. The method of example 46, wherein the plurality of SRS resources use a same number of ports.

Example 53. The method of example 46, wherein the plurality of SRS resources use a different number of ports.

Example 54. The method of example 31, wherein the MIMO uplink configuration information specifies both non codebook and antenna switching uplink MIMO operation.

Example 55. The method of example 54, wherein the plurality of SRS resources are configured for multiple usage for non codebook and antenna switching.

Example 56. The method of example 54, wherein performing uplink MIMO communication uses a guard interval between SRS resources when sounding using different antennas.

Example 57. The method of claim 54, wherein performing uplink MIMO communication does not a use a guard interval between SRS resources when sounding using same antennas.

Example 58. An apparatus, comprising: one or more processors, wherein the one or more processors are configured to cause a base station to perform the method of any of claims 31-57.

Example 59. A non-transitory, computer-accessible memory medium storing program instructions executable by one or more processors of a base station to perform the method of any of claims 31-57.

Example 60. A base station, comprising: a plurality of antennas; wireless communication circuitry coupled to the plurality of antennas; and one or more processors coupled to the wireless communication circuitry, wherein the one or more processors are configured to cause the base station to perform the method of any of claims 31-57.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

In some embodiments, a device includes: an antenna; a radio coupled to the antenna; and a processing element coupled to the radio. The device may be configured to implement any of the method embodiments described above.

In some embodiments, a memory medium may store program instructions that, when executed, cause a device to implement any of the method embodiments described above.

In some embodiments, an apparatus includes: at least one processor (e.g., in communication with a memory), that is configured to implement any of the method embodiments described above.

In some embodiments, a method includes any action or combination of actions as substantially described herein in the Detailed Description and claims.

In some embodiments, a method is performed as substantially described herein with reference to each or any combination of the Figures contained herein, with reference to each or any combination of paragraphs in the Detailed Description, with reference to each or any combination of Figures and/or Detailed Description, or with reference to each or any combination of the claims.

In some embodiments, a wireless device is configured to perform any action or combination of actions as substantially described herein in the Detailed Description, Figures, and/or claims.

In some embodiments, a wireless device includes any component or combination of components as described herein in the Detailed Description and/or Figures as included in a wireless device.

In some embodiments, a non-volatile computer-readable medium may store instructions that, when executed, cause the performance of any action or combination of actions as substantially described herein in the Detailed Description and/or Figures.

In some embodiments, an integrated circuit is configured to perform any action or combination of actions as substantially described herein in the Detailed Description and/or Figures.

In some embodiments, a mobile station is configured to perform any action or combination of actions as substantially described herein in the Detailed Description and/or Figures.

In some embodiments, a mobile station includes any component or combination of components as described herein in the Detailed Description and/or Figures as included in a mobile station.

In some embodiments, a mobile device is configured to perform any action or combination of actions as substantially described herein in the Detailed Description and/or Figures.

In some embodiments, a mobile device includes any component or combination of components as described herein in the Detailed Description and/or Figures as included in a mobile device.

In some embodiments, a network node is configured to perform any action or combination of actions as substantially described herein in the Detailed Description and/or Figures.

In some embodiments, a network node includes any component or combination of components as described herein in the Detailed Description and/or Figures as included in a mobile device.

In some embodiments, a base station is configured to perform any action or combination of actions as substantially described herein in the Detailed Description and/or Figures.

In some embodiments, a base station includes any component or combination of components as described herein in the Detailed Description and/or Figures as included in a mobile device.

In some embodiments, a 5G NR network node or base station is configured to perform any action or combination of actions as substantially described herein in the Detailed Description and/or Figures.

In some embodiments, a 5G NR network node or base station includes any component or combination of components as described herein in the Detailed Description and/or Figures as included in a mobile device.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A baseband processor, the baseband processor configured to:
receive multiple input, multiple output (MIMO) uplink configuration information from a base station, wherein the MIMO uplink configuration information indicates a plurality of sounding reference signal (SRS) resources;
receive downlink control information (DCI) from the base station, wherein the DCI specifies one or more MIMO parameters; and
perform uplink MIMO communication with the base station according to the MIMO uplink configuration and the one or more MIMO parameters, wherein two port SRS resources and four port SRS resources are configured in a same SRS resource set, wherein said performing uplink MIMO communication comprises transmitting physical uplink shared channel (PUSCH) transmissions so that a first PUSCH transmission scheduled with four port SRS resources is transmitted in partialAndNonCoherent and a second PUSCH transmission scheduled with two port SRS resources is transmitted in NonCoherent.

2. The baseband processor of claim 1, wherein a full power transmission mode 2 is configured.

3. The baseband processor of claim 1, wherein the MIMO uplink configuration information specifies codebook uplink MIMO operation.

4. The baseband processor of claim 1, wherein the MIMO uplink configuration information specifies codebook uplink MIMO operation, wherein the plurality of SRS resources include different numbers of ports, wherein a SRS resource indicator field is not present in the DCI, wherein performing uplink MIMO configuration is performed using a SRS resource having a lowest SRS resource indicator field value among the SRS resources of the plurality of SRS resources having a highest number of ports, in response to the SRS resource indicator field not being present in the DCI.

5. The baseband processor of claim 1, wherein the one or more MIMO parameters specify a first subset of the plurality of SRS resources for performing uplink MIMO communication, wherein performing uplink MIMO communication includes using the first subset of the plurality of SRS resources.

6. The baseband processor of claim 1, wherein performing uplink MIMO communication includes operating two ports based on a preconfigured assumption.

7. The baseband processor of claim 1, wherein performing uplink MIMO communication includes operating two ports based on a parameter value corresponding to the two port operation within a field in physical uplink shared channel (PUSCH) configuration.

8. A method, comprising:
receive multiple input, multiple output (MIMO) uplink configuration information from a base station, wherein the MIMO uplink configuration information indicates a plurality of sounding reference signal (SRS) resources;
receive downlink control information (DCI) from the base station, wherein the DCI specifies one or more MIMO parameters; and
perform uplink MIMO communication with the base station according to the MIMO uplink configuration and the one or more MIMO parameters, wherein two port SRS resources and four port SRS resources are configured in a same SRS resource set, wherein said performing uplink MIMO communication comprises transmitting physical uplink shared channel (PUSCH) transmissions so that a first PUSCH transmission scheduled with four port SRS resources is transmitted in partialAndNonCoherent and a second PUSCH transmission scheduled with two port SRS resources is transmitted in NonCoherent.

9. The method of claim 8, wherein a full power transmission mode 2 is configured.

10. The method of claim 8, wherein the MIMO uplink configuration information specifies codebook uplink MIMO operation.

11. The method of claim 8, wherein the MIMO uplink configuration information specifies codebook uplink MIMO operation, wherein the plurality of SRS resources include different numbers of ports, wherein a SRS resource indicator field is not present in the DCI, wherein performing uplink MIMO configuration is performed using a SRS resource having a lowest SRS resource indicator field value among the SRS resources of the plurality of SRS resources having a highest number of ports, in response to the SRS resource indicator field not being present in the DCI.

12. The method of claim 8, wherein the one or more MIMO parameters specify a first subset of the plurality of SRS resources for performing uplink MIMO communication, wherein performing uplink MIMO communication includes using the first subset of the plurality of SRS resources.

13. The method of claim 8, wherein performing uplink MIMO communication includes operating two ports based on a preconfigured assumption.

14. The method of claim 8, wherein performing uplink MIMO communication includes operating two ports based on a parameter value corresponding to the two port operation within a field in physical uplink shared channel (PUSCH) configuration.

15. A method, comprising:
transmit, to a user equipment (UE), multiple input, multiple output (MIMO) uplink configuration information, wherein the MIMO uplink configuration information indicates a plurality of sounding reference signal (SRS) resources;
transmit, to the UE, downlink control information (DCI), wherein the DCI specifies one or more MIMO parameters; and
perform uplink MIMO communication with the UE according to the MIMO uplink configuration and the one or more MIMO parameters, wherein two port SRS resources and four port SRS resources are configured in a same SRS resource set, wherein said performing uplink MIMO communication comprises receiving physical uplink shared channel (PUSCH) transmissions, wherein a first PUSCH transmission scheduled with four port SRS resources is received in partialAndNonCoherent and a second PUSCH transmission scheduled with two port SRS resources is received in NonCoherent.

16. The method of claim 15, wherein a full power transmission mode 2 is configured.

17. The method of claim 15, wherein the MIMO uplink configuration information specifies codebook uplink MIMO operation.

18. The method of claim 15, wherein the MIMO uplink configuration information specifies codebook uplink MIMO operation, wherein the plurality of SRS resources include different numbers of ports, wherein a SRS resource indicator field is not present in the DCI, wherein performing uplink MIMO configuration is performed using a SRS resource having a lowest SRS resource indicator field value among the SRS resources of the plurality of SRS resources having a highest number of ports responsive to the SRS resource indicator field not being present in the DCI.

19. The method of claim 15, wherein the one or more MIMO parameters specify a first subset of the plurality of SRS resources for performing uplink MIMO communication, wherein performing uplink MIMO communication includes using the first subset of the plurality of SRS resources.

20. The method of claim 15, wherein performing uplink MIMO communication includes operating two ports based on a preconfigured assumption.

* * * * *